United States Patent
Claessens et al.

(10) Patent No.: US 9,450,481 B2
(45) Date of Patent: Sep. 20, 2016

(54) OUTPUT CIRCUIT FOR MAGNETIC / ELECTRONIC TRANSFORMER

(71) Applicant: KONINKLIJKE PHILIPS N.V., Eindhoven (NL)

(72) Inventors: Dennis Johannes Antonius Claessens, Eindhoven (NL); Philip Louis Zulma Vael, Temse (BE); Patrick Alouisius Martina De Bruycker, Nuenen (NL); Yi Wang, Delft (NL); Sait Izmit, Utrecht (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/409,143

(22) PCT Filed: Jun. 17, 2013

(86) PCT No.: PCT/IB2013/054930
§ 371 (c)(1),
(2) Date: Dec. 18, 2014

(87) PCT Pub. No.: WO2014/001945
PCT Pub. Date: Jan. 3, 2014

(65) Prior Publication Data
US 2015/0200585 A1    Jul. 16, 2015

Related U.S. Application Data (60) Provisional application No. 61/664,885, filed on Jun. 27, 2012.

(51) Int. Cl.
*H02M 1/14* (2006.01)
*H02M 1/15* (2006.01)
(Continued)

(52) U.S. Cl.
CPC .................. *H02M 1/15* (2013.01); *H02M 1/44* (2013.01); *H02M 7/1626* (2013.01)

(58) Field of Classification Search
CPC ........ H02M 1/15; H02M 1/44; H02M 7/155; H02M 7/1555; H02M 7/1557; H02M 7/162; H02M 7/1623; H02M 7/1626; H02M 7/17
USPC ....... 363/39, 44–47; 315/119, 127, 276, 291
See application file for complete search history.

(56) References Cited

U.S. PATENT DOCUMENTS

| 5,111,084 A * | 5/1992 | Suko ............................. 327/544 |
| 5,636,107 A * | 6/1997 | Lu ........................... H02M 1/34 363/16 |

(Continued)

FOREIGN PATENT DOCUMENTS

| CN | 201611846 U | 10/2010 |
| DE | 202010003627 U1 | 7/2010 |
| WO | 2011033415 A1 | 3/2011 |

*Primary Examiner* — Jeffrey Gblende (57) ABSTRACT

Circuits (1) for receiving output signals from transformers (2) comprise filters (11) and switches (12). In the case of magnetic/electronic transformers, the filters (11) are activated/deactivated, for example for filtering/not filtering unwanted signals coming from converters (4). The filters (11) may comprise capacitors. The switches (12) may comprise fuses. Output signals of magnetic/electronic transformers comprise relatively low/high frequency signals that result in relatively small/large currents flowing through the capacitors, which currents will not blow/blow the fuses. The capacitors, when activated, form, together with leakage inductances of the magnetic transformers, electromagnetic interference filters. Alternatively, the circuits (1) may further comprise detectors (13) for detecting transformer types and for controlling the switches (12) in response to detection results. Then, possibly, the detectors (13) are arranged to detect frequency signals in the output signals and comprise comparators (15) for comparing detection results (14) with threshold values.

20 Claims, 6 Drawing Sheets

(51) Int. Cl.
*H02M 1/44* (2007.01)
*H02M 7/162* (2006.01)

(56) References Cited

U.S. PATENT DOCUMENTS

| | | |
|---|---|---|
| 7,667,408 B2 * | 2/2010 | Melanson et al. ........ 315/209 R |
| 2004/0095785 A1 | 5/2004 | Balakrishnan |
| 2006/0056207 A1 | 3/2006 | Sarlioglu |
| 2010/0207536 A1 * | 8/2010 | Burdalski et al. ............ 315/224 |
| 2010/0231136 A1 * | 9/2010 | Reisenauer et al. .......... 315/276 |
| 2011/0115400 A1 * | 5/2011 | Harrison et al. .............. 315/287 |
| 2011/0176341 A1 | 7/2011 | Huang |
| 2011/0285301 A1 * | 11/2011 | Kuang et al. ............. 315/200 R |
| 2012/0146539 A1 * | 6/2012 | Riesebosch ................... 315/291 |
| 2013/0039105 A1 * | 2/2013 | Rozman et al. .............. 363/126 |

* cited by examiner

OUTPUT CIRCUIT FOR MAGNETIC / ELECTRONIC TRANSFORMER

CROSS-REFERENCE TO PRIOR APPLICATIONS

This application is the U.S. National Phase under 35 U.S.C §371 of International Application No. PCT/IB13/054930, filed on Jun. 17, 2013, which claims the benefit of U.S. Provisional Patent Application No. 61/664,885, filed on Jun. 27, 2012. These applications are hereby incorporated by reference herein.

FIELD OF THE INVENTION

The invention relates to a circuit for receiving an output signal from a transformer. The invention further relates to a device.

Examples of such a device are lamps and parts thereof, such as transformers and converters.

BACKGROUND OF THE INVENTION

US 2004/0095785 A1 discloses a method and an apparatus for providing input electromagnetic interference filtering in power supplies. Said electromagnetic interference filtering is realized via a filter comprising a capacitor located between a rectifier and a power converter, an inductance located between said rectifier and said power converter or between an alternating current source and said rectifier, and a capacitance of said alternating current source.

SUMMARY OF THE INVENTION

It is an object of the invention to provide an improved circuit that can handle reception of output signals from at least two different types of transformers. It is a further object of the invention to provide an improved device.

According to a first aspect, a circuit is provided for receiving an output signal from a transformer, the circuit comprising a filter and a switch for, in the case of the transformer being a magnetic transformer, placing the filter in an activated mode and for, in the case of the transformer being an electronic transformer, placing the filter in a deactivated mode.

At least two different types of transformers can be distinguished: magnetic transformers and electronic transformers. Magnetic (passive) transformers for example comprise an iron core and windings made of copper. Electronic (active) transformers for example comprise a switched mode power supply based on a full bridge converter or a half bridge converter.

Sometimes, for example when replacing a halogen light or a fluorescent light by one or more light emitting diodes, a transformer already present cannot be replaced or should not be replaced. This transformer can be any one of the two different types of transformers.

The circuit as defined above comprises a filter and a switch. In the case of the transformer being a magnetic transformer, the switch places the filter in an activated mode. In the case of the transformer being an electronic transformer, the switch places the filter in a deactivated mode. As a result, a magnetic transformer is combined with the filter in the activated mode. In the case of a transformer in the form of an electronic transformer, the filter is in the deactivated mode.

The invention is based on the insight that electronic transformers already comprise electromagnetic interference filters, and magnetic transformers do not comprise such electromagnetic interference filters. The invention is based on the basic idea that magnetic transformers should get (additional) filtering, and electronic transformers should not get said (additional) filtering.

An embodiment of the circuit is defined by the filter, in the activated mode, filtering an unwanted signal coming from a converter, and the filter, in the deactivated mode, not filtering any signal. As a result, an unwanted signal, such as noise, coming from a converter having an input coupled to an output of the circuit is filtered by a combination of the magnetic transformer and the filter in the activated mode, and an unwanted signal, such as noise, coming from a converter having an input coupled to an output of the circuit is filtered by the electronic transformer itself without the filter being involved. In the activated mode, the filter has a relatively high impact and removes, in cooperation with the magnetic transformer, noise coming from the converter to a relatively high extent, and in the deactivated mode, the filter has a relatively low impact and disturbs the electronic transformer to a relatively low extent or not at all. Said noise may result in problems when entering the mains and when entering equipment in the vicinity of the circuit.

An embodiment of the circuit is defined by the filter comprising a capacitor, the switch comprising a fuse, and the fuse forming part of the capacitor or the fuse being coupled serially to the capacitor. In the case of a transformer in the form of a magnetic transformer, its output signal will comprise a relatively low frequency signal. Such a relatively low frequency signal will result in a relatively small current flowing through the capacitor, which relatively small current will not bring the fuse into the non-conducting mode. In the case of a transformer in the form of an electronic transformer, its output signal will comprise a relatively high frequency signal. Such a relatively high frequency signal will result in a relatively large current flowing through the capacitor, which relatively large current will bring the fuse into a non-conducting mode. As a result, in the case of a transformer in the form of a magnetic transformer, the capacitor is connected to the transformer and will form, together with a leakage inductance of the magnetic transformer, an electromagnetic interference filter. In the case of a transformer in the form of an electronic transformer, the capacitor is disconnected from the transformer.

An embodiment of the circuit is defined in that it further comprises a detector for detecting whether the transformer is the magnetic transformer or the electronic transformer and for controlling the switch in response to the detection result. The detector is arranged for distinguishing both types of transformers visually or analytically or otherwise and is arranged for controlling the switch. As a result, in the case of a transformer in the form of a magnetic transformer, the filter is connected to the transformer and will form, together with a leakage inductance of the magnetic transformer, an electromagnetic interference filter. In the case of a transformer in the form of an electronic transformer, the filter is disconnected from the transformer.

An embodiment of the circuit is defined by the detector being arranged to detect a frequency signal in the output signal of the transformer, and the detector comprising a comparator for comparing the detection result with a threshold value. As described above, in the case of a transformer in the form of a magnetic transformer, its output signal will comprise a relatively low frequency signal, and in the case of a transformer in the form of an electronic transformer, its output signal will comprise a relatively high frequency signal etc.

An embodiment of the circuit is defined by the filter comprising a capacitor coupled serially to the switch or forming part of the switch. As described above, in the case of a transformer in the form of a magnetic transformer, the capacitor is connected to the transformer and will form, together with a leakage inductance of the magnetic transformer, an electromagnetic interference filter. In the case of a transformer in the form of an electronic transformer, the capacitor is disconnected from the transformer.

According to a second aspect, a device is provided comprising the circuit as defined above and further comprising a rectifier. So, the circuit may receive the output signal from the transformer directly, or indirectly via the rectifier. Such a rectifier comprises for example one diode or two diodes or four diodes in a bridge. Each diode may be a real diode or a zener diode or (a part of) a transistor or another element with a diode function etc.

An embodiment of the device is defined by the filter, in the activated mode, filtering an unwanted signal coming from a converter, and the filter, in the deactivated mode, not filtering any signal.

An embodiment of the device is defined by the circuit being coupled to an input of the rectifier, the filter comprising a capacitor, the switch comprising a fuse, and the fuse forming part of the capacitor or the fuse being coupled serially to the capacitor.

An embodiment of the device is defined by the circuit further comprising a detector for detecting the transformer being the magnetic transformer or the electronic transformer and for controlling the switch in response to the detection result, the filter being coupled to an input or to an output of the rectifier circuit, and the detector being coupled to a terminal of the rectifier. In the case of a rectifier in the form of a bridge with four diodes, the terminal may be one of the inputs or one of the outputs of the bridge.

An embodiment of the device is defined by the detector being arranged to detect a frequency signal in the output signal of the transformer, and the detector comprising a comparator for comparing the detection result with a threshold value.

An embodiment of the device is defined by the filter comprising a capacitor coupled serially to the switch or forming part of the switch.

An embodiment of the device is defined in that it further comprises the transformer an output of which is coupled to an input of the circuit.

An embodiment of the device is defined in that it further comprises a converter an input of which is coupled to an output of the circuit. Such a converter is for example a direct-current-to-direct-current converter, such as for example a boost converter etc.

An embodiment of the device is defined in that it further comprises one or more light emitting diodes coupled to an output of the converter.

The problem of providing an improved circuit has been solved. A further advantage is that, in the case of a transformer in the form of a magnetic transformer, electromagnetic interference is filtered well, and, in the case of a transformer in the form of an electronic transformer, the filter will not disturb the electronic transformer that is itself already capable of filtering electromagnetic interference well.

These and other aspects of the invention will be apparent from and elucidated with reference to the embodiments described hereinafter.

DETAILED DESCRIPTION OF EMBODIMENTS

Figure 1:
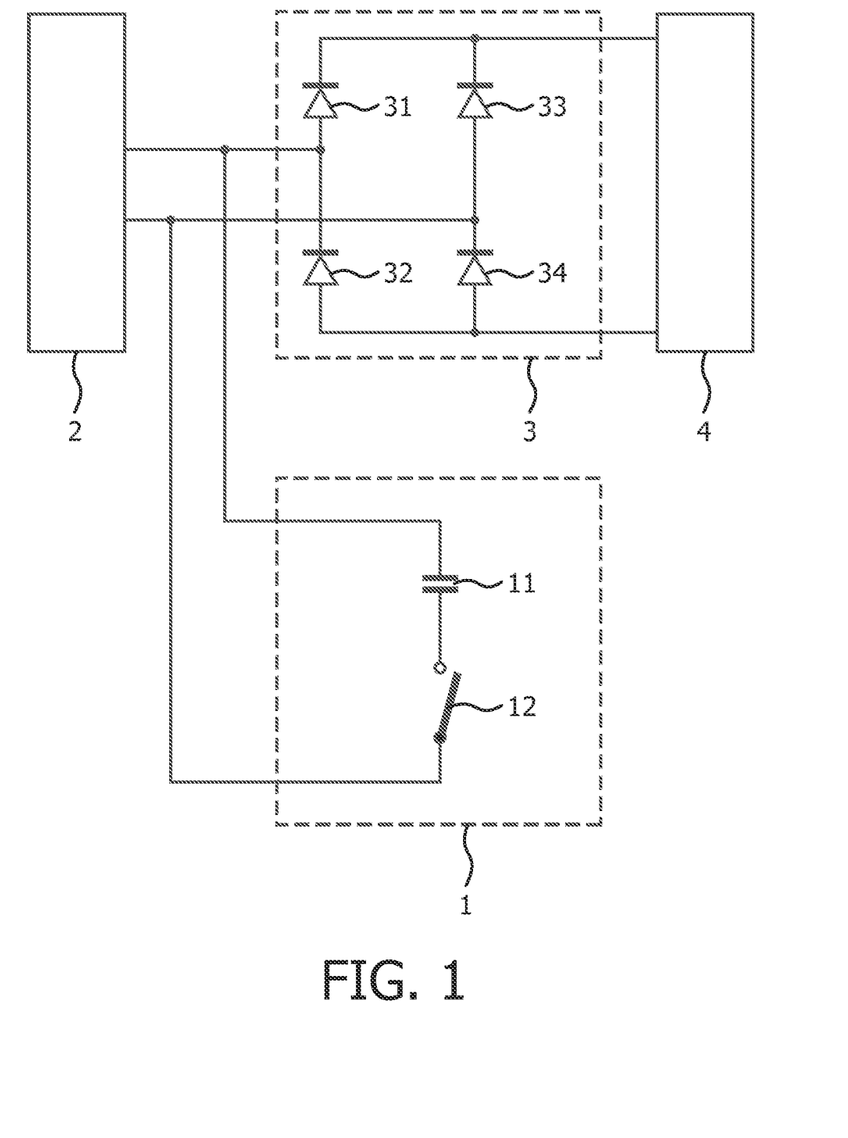
FIG. 1 shows a first embodiment of a circuit.

In FIG. 1, a first embodiment of a circuit 1 is shown. Outputs of a transformer 2 are coupled to inputs of a rectifier 3 comprising four diodes 31-34 in a diode bridge. Outputs of the rectifier 3 are coupled to inputs of a converter 4. Inputs (not shown) of the transformer 2 are for example coupled to an alternating current voltage supply (not shown), possibly via a dimmer (not shown). Outputs (not shown) of the converter 4 are for example coupled to one or more light emitting diodes (not shown).

The circuit 1 comprises a serial connection of a filter 11 and a switch 12, which serial connection is coupled to the outputs of the transformer 2. The filter 11 may for example be a capacitor, and the switch 12 may be, for example, but not exclusively, a fuse.

At least two different types of transformers 2 can be distinguished: magnetic transformers and electronic transformers. Magnetic transformers for example comprise an iron core and windings made of copper. Electronic transformers for example comprise a switched mode power supply based on a full bridge converter or a half bridge converter.

In the case of a transformer 2 in the form of a magnetic transformer, its output signal will comprise a relatively low frequency signal. Such a relatively low frequency signal will result in a relatively small current flowing through the capacitor, which relatively small current will keep the fuse in the conducting mode. In the case of a transformer 2 in the form of an electronic transformer, its output signal will comprise a relatively high frequency signal. Such a relatively high frequency signal will result in a relatively large current flowing through the capacitor, which relatively large current will bring the fuse into the non-conducting mode. As a result, in the case of a transformer 2 in the form of a magnetic transformer, the capacitor is connected to the transformer 2 and will form, together with a leakage inductance of the magnetic transformer, an electromagnetic interference filter. In the case of a transformer 2 in the form of an electronic transformer, the capacitor is disconnected from the transformer 2 once and for all.

More in general, in the case of the transformer 2 being a magnetic transformer, the switch 12 places the filter 11 in an activated mode. In the case of the transformer 2 being an electronic transformer, the switch 12 places the filter 11 in a deactivated mode. As a result, a magnetic transformer is combined with the filter 11 in the activated mode. In the case of a transformer 2 in the form of an electronic transformer, the filter 11 is in the deactivated mode.

In the activated mode, an unwanted signal, such as noise, coming from the converter 4 is filtered (substantially removed) by a combination of the magnetic transformer and the filter 11 in the activated mode, and, in the deactivated mode, an unwanted signal such as noise coming from the converter 4 is filtered (substantially removed) by the electronic transformer itself without the filter 11 being involved.

Figure 2:
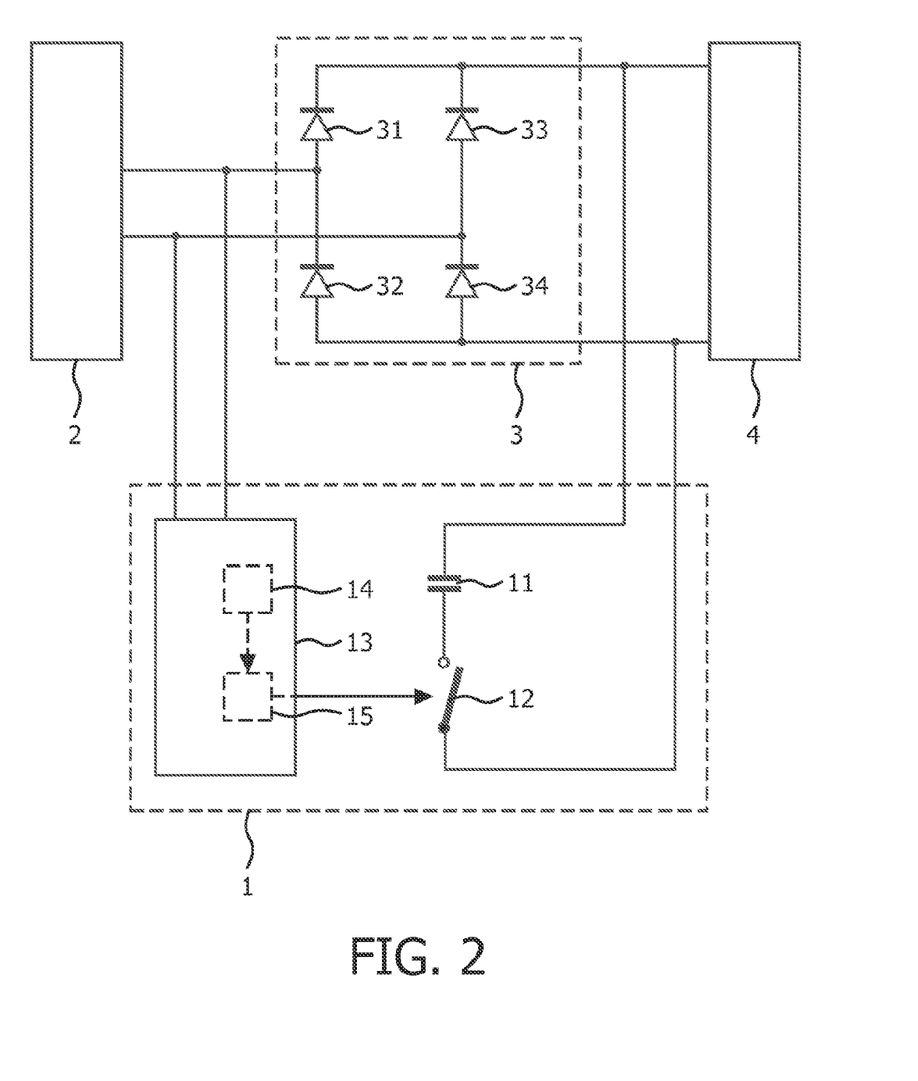
FIG. 2 shows a second embodiment of a circuit.

In FIG. 2, a second embodiment of a circuit 1 is shown. Again, the circuit 1 comprises a serial connection of a filter 11 and a switch 12, the serial connection here being coupled to the outputs of the rectifier 3. The filter 11 may for example be a capacitor, and the switch 12 may for example be a controllable switch. The second embodiment further differs from the first embodiment in that the circuit 1 comprises a detector 13 for detecting the transformer 2, being the magnetic transformer or the electronic transformer, and for controlling the switch 12 in response to the detection result performed/produced by the detector 13. The detector 13 is arranged for distinguishing both types of transformers 2 visually or analytically or otherwise. As a result, in the case of a transformer 2 in the form of a magnetic transformer, the filter 11 is connected to the transformer 2 (here via the rectifier 3) and will form, together with a leakage inductance of the magnetic transformer, an electromagnetic interference filter. For a transformer 2 in the form of an electronic transformer, the filter 11 is disconnected from the transformer 2.

To be able to distinguish both types of transformers 2, inputs of the detector 13 are coupled to outputs of the transformer 2. Alternatively, inputs of the detector 13 may be coupled to outputs of the rectifier 3 or to one input and one output of the rectifier 3 etc. Alternatively, the serial connection may be coupled to the inputs of the rectifier 3.

Preferably, the detector 13 is arranged to detect a frequency signal in the output signal of the transformer 2, and the detector 13 comprises a comparator 15 for comparing the detection result 14 performed/produced by the detector 13 with a threshold value. As described above, in the case of a transformer 2 in the form of a magnetic transformer, its output signal will comprise a relatively low frequency signal (for example 50 Hz or 60 Hz), in which case the switch 12 is to be put into the conducting mode, and in the case of a transformer 2 in the form of an electronic transformer, its output signal will comprise a relatively high frequency signal (for example 22 10 kHz), in which case the switch 12 is to be put into the non-conducting mode, etc.

The second embodiment is not a "once and for all" embodiment but can react "over and over again" to new situations.

For both embodiments many alternatives will be possible. For example, the switch 12 in the form of a fuse may form part of the filter 11, and the filter 11 in the form of a capacitor may form part of the switch 12. Other connections of the filter 11 and the switch 12 such as parallel connections, and other filters 11 such as inductors or combinations of capacitors and inductors or combinations of reactive elements and resistors are not to be excluded. The kind of filter 11 and the kind of connection necessary may depend upon what reactivity is to be activated/deactivated and upon how this reactivity is to be activated/deactivated.

Figure 3:
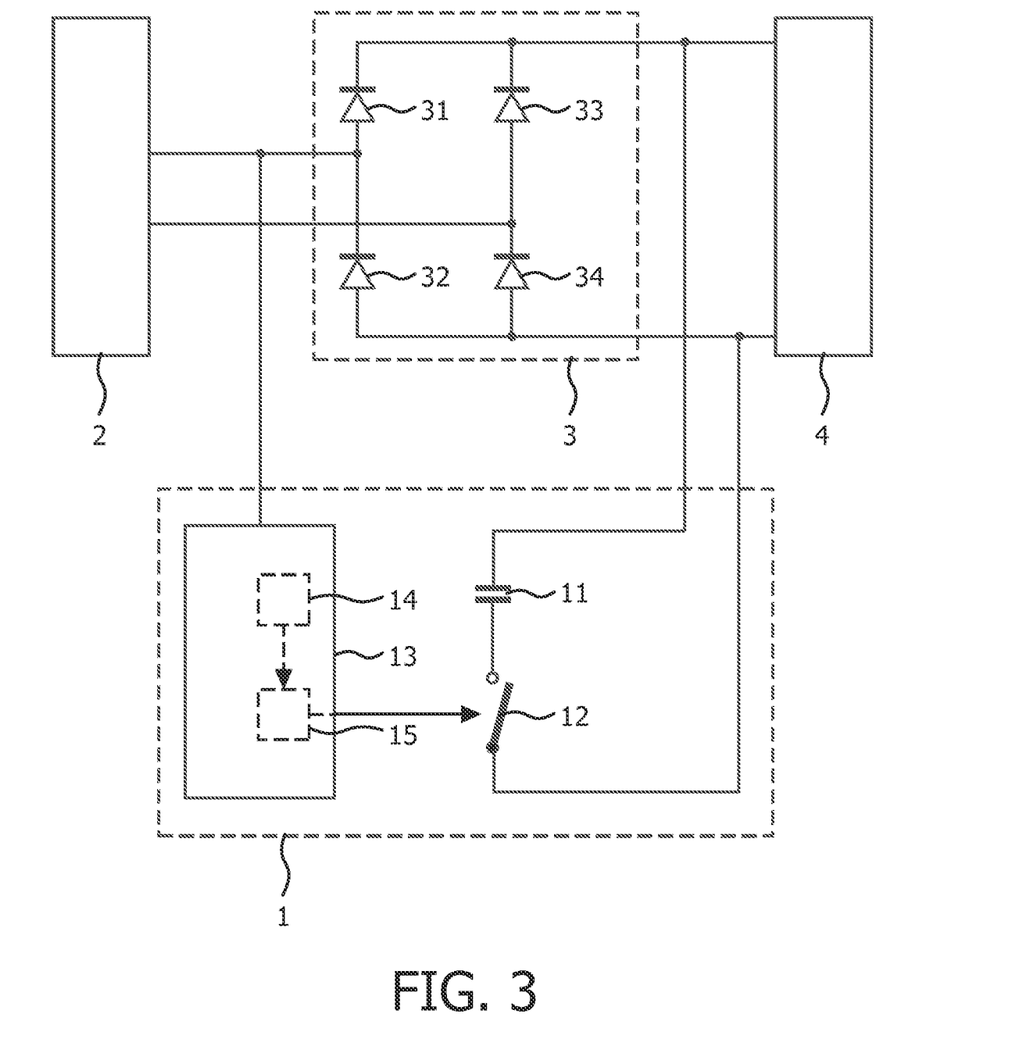
FIG. 3 shows a third embodiment of a circuit.

In FIG. 3, a third embodiment of a circuit 1 is shown that only differs from the second embodiment in that the inputs of the detector 13 are now coupled to one input and one output of the rectifier 3.

Figure 4:
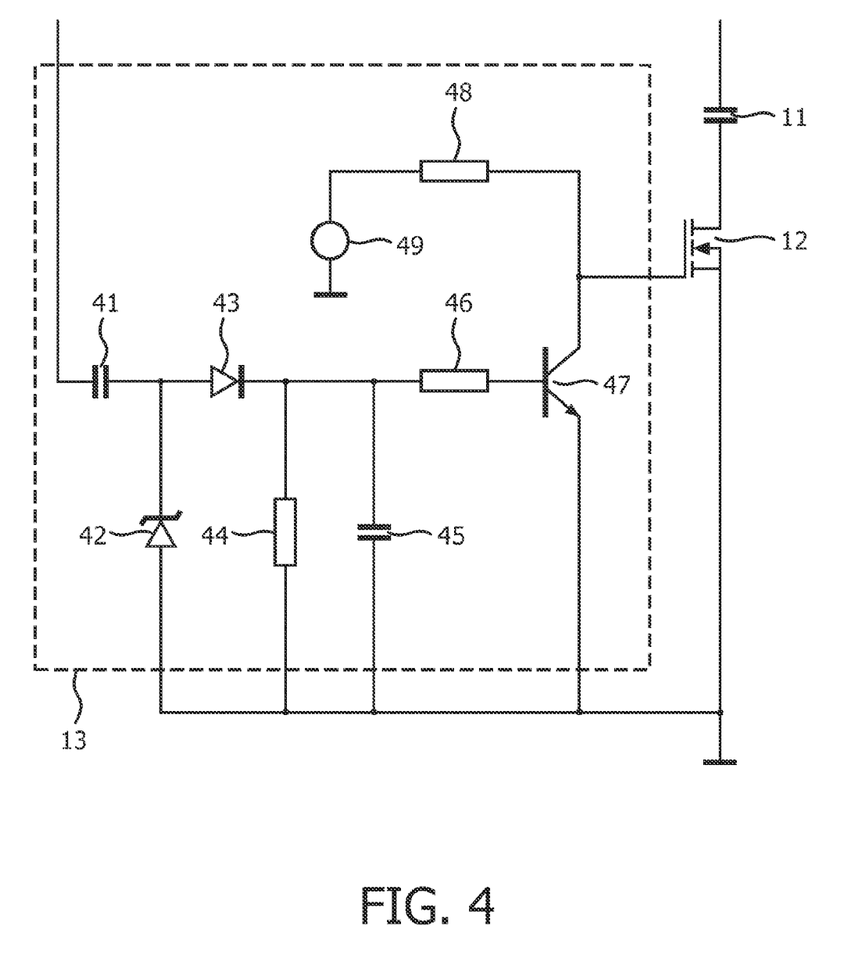
FIG. 4 shows an embodiment of a detector.

In FIG. 4, an embodiment of a detector 13 is shown for the third embodiment of the circuit 1 as shown in FIG. 3. The detector 13 comprises a capacitor 41 (high-pass-filter) coupled to said one input of the rectifier 3 and to one side of a zener diode 42 (voltage definer) and to one side of a diode 43 (rectifier). Another side of the zener diode 42 is coupled to said one output (ground) of the rectifier 3, and another side of the diode 43 is coupled to one side of a resistor 44 and to one side of a capacitor 45 (buffer) and to one side of a resistor 46. Another side of the resistor 44 and another side of the capacitor 45 are coupled to said one output (ground) of the rectifier 3, and another side of the resistor 46 is coupled to a control electrode of a transistor 47. A first main electrode of the transistor 47 is coupled to said one output (ground) of the rectifier 3, and a second main electrode of the transistor 47 is coupled to one side of a resistor 48 that on its other side receives a voltage signal from a voltage source 49. The second main electrode of the transistor 47 is further coupled to a control electrode of a MOSFET transistor that here forms the switch 12. A first main side of this MOSFET transistor is coupled to said one output (ground) of the rectifier 3, and a second main side of this MOSFET transistor is coupled via the filter 11 to another output of said rectifier 3. Other kinds of switches are not to be excluded, such as other kinds of transistors and mechanical switches etc.

In the case of a transformer 2 in the form of a magnetic transformer, its output signal will comprise a relatively low frequency signal, in which case the elements 41-46 will provide a first detection result in the form of a relatively low voltage signal to the control electrode of the transistor 47, in response to which first detection result the transistor 47 will not conduct. As a result, the switch 12 receives a relatively high voltage signal at its control electrode via the resistor 48 and the voltage source 49 and is put into a conducting mode. In the case of a transformer 2 in the form of an electronic transformer, its output signal will comprise a relatively high frequency signal, in which case the elements 41-46 will provide a second detection result in the form of a relatively high voltage signal to the control electrode of the transistor 47, in response to which second detection result the transistor 47 will conduct. As a result, the switch 12 receives a relatively low voltage signal at its control electrode and is put into a non-conducting mode etc.

So, the elements 41-46 provide the detection result 14 to the comparator 15 that is realized via the transistor 47 and that compares the voltage signal as provided by the elements 41-46 with its threshold voltage as required between the control electrode and the first main electrode. The invention is, however, not limited to this embodiment of the detector, and many other alternative embodiments of the detector 13 will be possible. For example, the serial capacitor 41 could be replaced by and/or combined with an inductor coupled in parallel to the zener diode 42, and other comparators may be realized via other transistor constructions and/or operational amplifiers etc.

Figure 5:
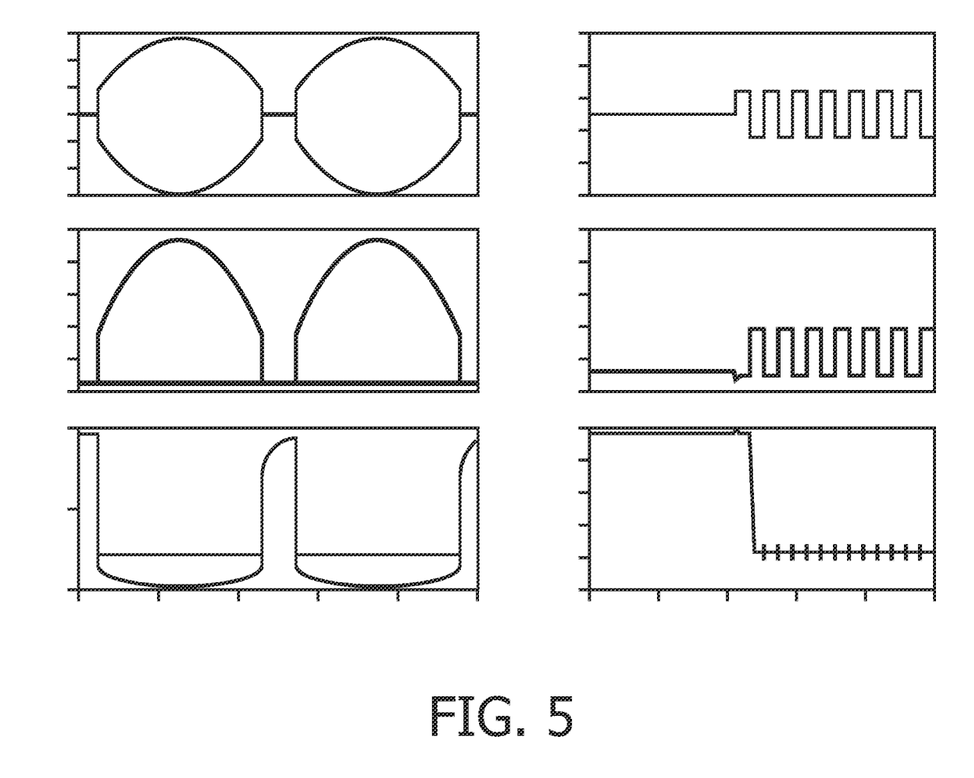
FIG. 5 shows waveforms for an electronic transformer.

In FIG. 5, waveforms are shown in case an electronic transformer is present. On the left side, the upper waveform shows an output voltage signal coming from the transformer 2, the middle waveform shows an input voltage signal presented to the detector 13, and the lower waveform shows an input voltage signal presented to the switch 12. All left-side waveforms are shown for the first 20 msec. On the right side, the same waveforms are shown but now for a time interval from 0.95 msec, to 1.07 msec, to clarify the start-up of the electronic transformer. As soon as a relatively high frequency signal in the output signal of the electronic transformer is detected, the switch 12 is put into the non-conducting mode, and the filter 11 is deactivated.

Figure 6:
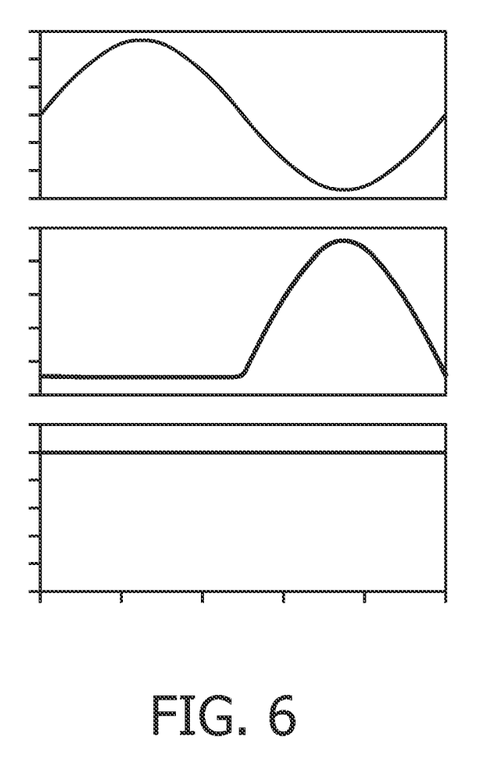
FIG. 6 shows waveforms for a magnetic transformer.

In FIG. 6, waveforms are shown in case a magnetic transformer is present. Again, the upper waveform shows an output voltage signal coming from the transformer 2, the middle waveform shows an input voltage signal presented to the detector 13, and the lower waveform shows an input voltage signal presented to the switch 12. All waveforms are shown for the first 20 msec. The switch 12 is in a conducting mode all the time and the filter 11 is activated.

Summarizing, circuits 1 for receiving output signals from transformers 2 comprise filters 11 and switches 12. For magnetic/electronic transformers, the filters 11 are activated/deactivated, for example for filtering/not filtering unwanted signals coming from converters 4. The filters 11 may comprise capacitors. The switches 12 may comprise fuses. Output signals of magnetic/electronic transformers comprise relatively low/high frequency signals that result in relatively small/large currents flowing through the capacitors, which currents will not blow/blow the fuses. The capacitors, when activated, form, together with leakage inductances of the magnetic transformers, electromagnetic interference filters. Alternatively, the circuits 1 may further comprise detectors 13 for detecting transformer types and for controlling the switches 12 in response to detection results. Then, possibly, the detectors 13 are arranged to detect frequency signals in the output signals and comprise comparators 15 for comparing detection results 14 with threshold values.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A circuit for receiving an output signal from an electronic transformer or a magnetic transformer, the circuit comprising:
   a filter;
   a switch electrically coupled to the filter, in the case of the magnetic transformer, configured to place the filter in an activated mode, and in the case of the electronic transformer, the switch is configured to place the filter in a deactivated mode; and
   a detector configured to detect a transformer type, being the magnetic transformer or the electronic transformer, and configured to control the switch in response to whether: the transformer type is the magnetic transformer, or the transformer type is the electronic transformer.

2. The circuit of claim 1, wherein the filter is configured to filter an unwanted signal coming from a converter in the activated mode, and not to filter any signal in the deactivated mode.

3. The circuit of claim 1, the detector being configured to detect a frequency signal in the output signal of the transformer, and the detector comprising a comparator for comparing the detection result with a threshold value, and to determine whether the transformer type is the magnetic transformer, or the transformer type is the electronic transformer, based on a result of the comparison.

4. The circuit of claim 1, the filter comprising a capacitor coupled serially to the switch or forming part of the switch.

5. The circuit of claim 1, further comprising a rectifier.

6. The circuit of claim 5, wherein the filter is configured to filter an unwanted signal coming from a converter in the activated mode, and not to filter any signal in the deactivated mode.

7. The circuit of claim 5, wherein the filter is coupled to an input of the rectifier, and wherein the filter comprises a capacitor.

8. A circuit for receiving an output signal from an electronic transformer or a magnetic transformer, the circuit comprising:
   a rectifier circuit;
   a filter;
   a switch electrically coupled to the filter, in the case of the magnetic transformer, configured to place the filter in an activated mode, and in the case of the electronic transformer, the switch is configured to place the filter in a deactivated mode; and
   a detector configured to detect a transformer type, being the magnetic transformer or the electronic transformer, and for controlling the switch in response to whether: the transformer type is the magnetic transformer, or the transformer type is the electronic transformer, the filter being coupled to an input or to an output of the rectifier circuit, and the detector being coupled to a terminal of the rectifier circuit.

9. The circuit of claim 8, the detector being configured to detect a frequency signal in the output signal of the transformer, and the detector comprising a comparator for comparing the detection result with a threshold value, and to determine whether the transformer type is the magnetic transformer, or the transformer type is the electronic transformer, based on a result of the comparison.

10. The circuit of claim 8, the filter comprising a capacitor coupled serially to the switch or forming part of the switch.

11. The circuit of claim 1, further comprising an output of the transformer which is coupled to an input of the filter.

12. The circuit of claim 1, further comprising an input of a converter which is coupled to an output of the filter.

13. The circuit of claim 12, further comprising one or more light emitting diodes coupled to an output of the converter.

14. The circuit of claim 1, wherein one of:
   (1) the detector is configured to close the switch when the transformer type is the magnetic transformer and to open the switch when the transformer type is the electronic transformer; and
   (2) the detector is configured to open the switch when the transformer type is the magnetic transformer and to close the switch when the transformer type is the electronic transformer.

15. A device, comprising:
   an input configured to receive an input signal from a transformer, wherein the transformer has a transformer type which is one selected from the group consisting of a magnetic transformer and an electronic transformer;
   an electromagnetic interference (EMI) filter connected to the input; and
   a switch configured to selectively activate the EMI filter when the transformer type is the magnetic transformer and to deactivate the EMI filter when the transformer type is the electronic transformer,
   wherein the EMI filter is configured when activated to filter EMI from being communicated through the device to the transformer and when deactivated to not filter EMI from being communicated through the device to the transformer.

16. The device of claim 15, wherein the switch comprises a fuse which is configured to remain closed when the transformer is a magnetic transformer and which is configured to be blown open when the transformer is an electronic transformer.

17. The device of claim 15, further comprising a detector configured to determine the transformer type and to control the switch to activate the filter when the transformer type is the magnetic transformer and to deactivate the filter when the transformer type is the electronic transformer.

18. The device of claim 17, wherein the detector is configured to detect a frequency in the input signal, and is further configured to determine that the transformer type is the magnetic transformer when the detected frequency in the input signal is less than a threshold, and to determine that the transformer type is the electronic transformer when the detected frequency in the input signal is greater than a threshold.

19. The circuit of claim 8, wherein one of:
(1) the detector is configured to close the switch when the transformer type is the magnetic transformer and to open the switch when the transformer type is the electronic transformer; and
(2) the detector is configured to open the switch when the transformer type is the magnetic transformer and to close the switch when the transformer type is the electronic transformer.

20. The circuit of claim 8, wherein the filter is configured to filter an unwanted signal coming from a converter in the activated mode, and not to filter any signal in the deactivated mode.

* * * * *